US009639903B2

(12) United States Patent
Rosa

(10) Patent No.: US 9,639,903 B2
(45) Date of Patent: May 2, 2017

(54) CROP YIELD PER LOCATION MEASURER

(71) Applicant: Trimble Navigation Limited, Sunnyvale, CA (US)

(72) Inventor: Uriel Rosa, Woodland, CA (US)

(73) Assignee: Trimble Inc., Sunnyvale, CA (US)

( * ) Notice: Subject to any disclaimer, the term of this patent is extended or adjusted under 35 U.S.C. 154(b) by 299 days.

(21) Appl. No.: 14/246,504

(22) Filed: Apr. 7, 2014

(65) Prior Publication Data

US 2015/0287149 A1    Oct. 8, 2015

(51) Int. Cl.
| | |
|---|---|
| G01F 17/00 | (2006.01) |
| G06Q 50/02 | (2012.01) |
| G01S 19/14 | (2010.01) |
| G06Q 10/06 | (2012.01) |
| G09B 29/10 | (2006.01) |
| G01S 19/42 | (2010.01) |

(52) U.S. Cl.
CPC ............ G06Q 50/02 (2013.01); G01F 17/00 (2013.01); G01S 19/14 (2013.01); G01S 19/426 (2013.01); G06Q 10/06393 (2013.01); G09B 29/10 (2013.01)

(58) Field of Classification Search
CPC ................................ G01F 17/00; G09B 29/10
USPC ............................ 701/439, 459, 462; 73/149
See application file for complete search history.

(56) References Cited

U.S. PATENT DOCUMENTS

| 7,399,220 B2 | 7/2008 | Kriesel et al. | |
| 2002/0014116 A1* | 2/2002 | Campbell | A01D 33/00 73/149 |
| 2014/0125651 A1* | 5/2014 | Sharp | G06T 15/04 345/419 |
| 2014/0236381 A1* | 8/2014 | Anderson | A01D 75/00 701/1 |
| 2014/0262547 A1* | 9/2014 | Acheson | G01G 21/23 177/1 |
| 2015/0116330 A1* | 4/2015 | Chiocco | G06Q 10/00 345/440 |

OTHER PUBLICATIONS

"3D Image Sensing Using Smart Pizel Technology", ifm efector, www.ifm.com/us/3Dsensor, 6 pages.

* cited by examiner

*Primary Examiner* — Sujay Koneru
(74) *Attorney, Agent, or Firm* — Kilpatrick Townsend & Stockton LLP

(57) ABSTRACT

A crop yield per location measurer is disclosed. In general, the crop yield measurer includes a crop collector for a field of crops. The crop collector includes a navigation satellite system location determiner to determine location information at periodic times during a crop collection process. The crop collector also includes an optical mechanism to optically determine a volume of collected crops at the periodic times during the crop collection process. In addition, a database is used for storing the location information and the volume at the periodic times during the crop collection process. A crop yield overview generator is then utilized to provide a user accessible crop yield per location overview for the field of crops based on the information stored at the database.

24 Claims, 8 Drawing Sheets

CROP YIELD PER LOCATION MEASURER

TECHNICAL FIELD

Embodiments of the present technology relate to measuring and monitoring crop yield.

BACKGROUND ART

In agriculture, crop yield is a significant factor in profitability. Because of the importance of crop yield, numerous metrics are utilized in attempts to reap the greatest amount of quality crop from any given field. A number of the metrics can include age of plant, soil type, water location, water access, fertilizer/pesticide requirements, etc.

In a farming environment, enhancing crop yield is a significant an ongoing field of endeavor. However, it is also important that the gain in crop yield not be offset or overshadowed by the costs associated with achieving the crop yield gain.

BRIEF DESCRIPTION OF THE DRAWINGS

The accompanying drawings, which are incorporated in and form a part of this specification, illustrate embodiments of the present technology and, together with the description, serve to explain the principles of the present technology. The drawings referred to in this description should not be understood as being drawn to scale except if specifically noted.

DESCRIPTIONS OF EMBODIMENTS

Figure 1:
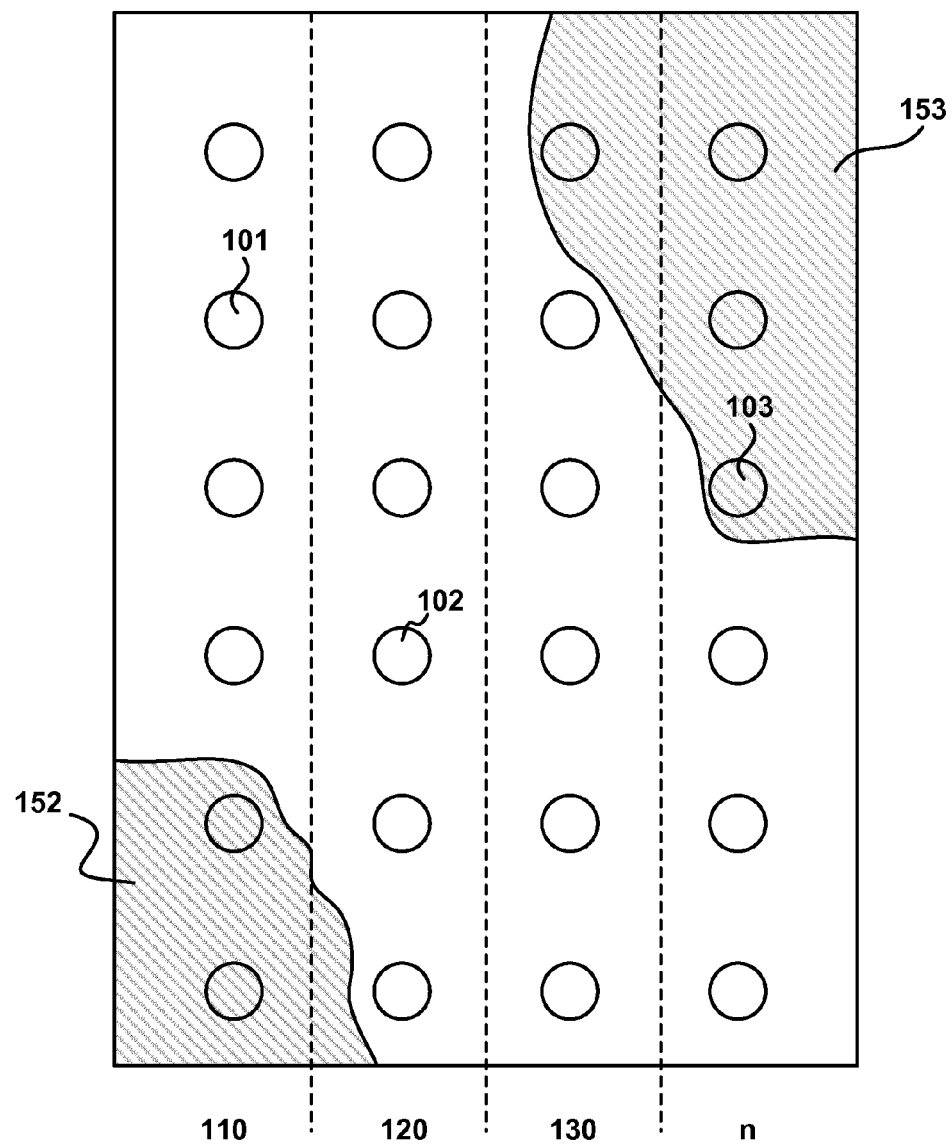
FIG. 1 is a diagram of field of plants, according to one embodiment of the present technology.

Reference will now be made in detail to various embodiments of the present technology, examples of which are illustrated in the accompanying drawings. While the present technology will be described in conjunction with these embodiments, it will be understood that they are not intended to limit the present technology to these embodiments. On the contrary, the present technology is intended to cover alternatives, modifications and equivalents, which may be included within the spirit and scope of the present technology as defined by the appended claims. Furthermore, in the following description of the present technology, numerous specific details are set forth in order to provide a thorough understanding of the present technology. In other instances, well-known methods, procedures, components, and circuits have not been described in detail as not to unnecessarily obscure aspects of the present technology.

Unless specifically stated otherwise as apparent from the following discussions, it is appreciated that throughout the present description of embodiments, discussions utilizing terms such as "receiving", "storing", "generating", "transmitting", "inferring," or the like, refer to the actions and processes of a computer system, or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. Embodiments of the present technology are also well suited to the use of other computer systems such as, for example, mobile communication devices.

Overview

In the area of orchard type agriculture, a plant may have an average production life. For example, if a plant has a 10 year production life, a plant in its first or second year may not yield much crop, while the third through eighth years will be the peak harvest years. At about year nine, it will be time to remove the plant and replace it with a new plant, thereby continuing the cycle.

However, a farmer may have a number of plants in the field that stopped producing crop at five years. Alternatively, the field may include a number of plants that are continuing to produce crop strongly at the ninth year.

Similarly, the field may include locations that provide significantly better plant growth and crop yield than in other locations. Moreover, these differing locations may be spread throughout the field.

The following technology, when employed in a farming environment, provides significant crop yield location specific metrics which can be used to provide insight directly related to crop yield at per plant, per row, per portion of field or per nut tree orchard level. Moreover, utilizing the embodiments described herein, the gained crop yield information is not offset or overshadowed by the costs associated with the achieving of the information.

With reference now to FIG. 1, a diagram of a field 100 is shown. In general, field 100 includes a number of plants 101-103 divided into a number of rows 110-$n$ and two areas of interest 152-153. For purposes of clarity in the following discussion, only plants 101, 102 and 103 are specifically pointed out. In addition, although field 100 includes a number of rows, for purposes of clarity, the following discussion utilizes rows 110-$n$. Moreover, although field 100 may include any number, including no areas of interest, for purposes of clarity, the following discussion utilizes only areas of interest 152 and 153. Although a number of rows and plants and areas of interest are shown, these are provided merely for clarity in the discussion. The actual number of rows, plants, areas and size of the field may be modified as described herein or in other aspects which are not directly stated herein but which should be considered variants thereof.

In one embodiment, field 100 may be a representation of a field of a single crop such as, but not limited to, a nut tree grove, a citrus grove, a field of berries, a field of grapes, a field of wheat or the like. For example, in one embodiment, the entire field 100 including plants 101-103 may be individual Pistachio trees, sugarcane plants or the like.

In another embodiment, field 100 may be a representation of a field of numerous crop types. For example, rows 110-120 may be corn rows, while row 130-*n* may be pumpkin rows.

Although only one field 100 is shown, field 100 may directly correlate to an entire farm field or may be only a portion thereof. For example, in field 100 approximately 24 plants are shown. However, it is quite possible that an orchard of trees may include hundreds or even thousands of trees or plants. As such, field 100 may be a view of only a portion of the entire field.

Figure 2A:
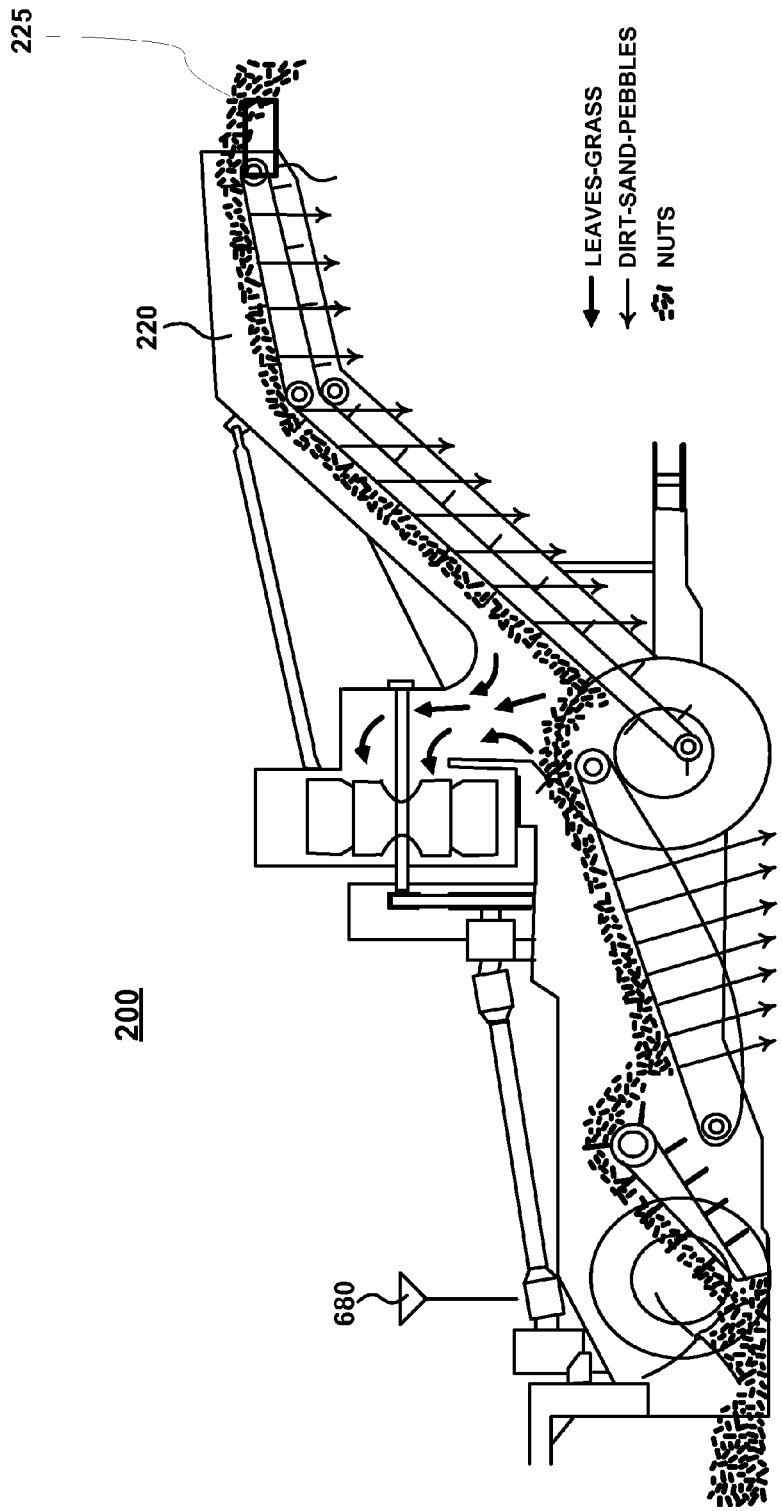
FIG. 2A is a diagram of a crop yield measuring apparatus utilizing a conveyor weighing system, according to one embodiment of the present technology.

With reference now to FIG. 2A, a diagram of a harvester 200 with a crop volume measuring apparatus 225 is shown according to one embodiment of the present technology. In one embodiment, harvester 200 includes a location determiner GNSS 680, a conveyor 220, and an optical device 225. In one embodiment, the optical device 225 comprises a camera or cameras that can be used to count and measure the yield of the crop. In one embodiment, the optical device 225 is a crop yield measurer. In one embodiment, the optical device performs a volume measurement for a given crop. This volume can be used to determine a mass in one embodiment, based on a conversion factor.

In one embodiment, harvester 200 may be a vehicle that works alone to harvest the crop from a field; such as, for example, a grain harvester. In another embodiment, harvester 200 may be the collector vehicle in a harvesting group of vehicles. In one embodiment, harvester 200 may be a nut harvesting vehicle that collects nuts from the ground. For example, the nut crop may be shaken to the ground to be naturally dried for few weeks before being picked up from the orchard floor by mechanical harvesters. One embodiment shows the path almond nuts follow when picked up from the orchard floor on the left side. The nuts are discharged to the storage tank on the right side. The leaves, grass, dirt, sand, pebbles and the like are shown being removed from the collected nuts. In one embodiment, the optical device 225 can be mounted on the end of the transferring conveyor 220, shown on the right.

In one embodiment, conveyor 220 may be mounted perpendicular to the position shown in FIG. 2A.

Figure 2B:
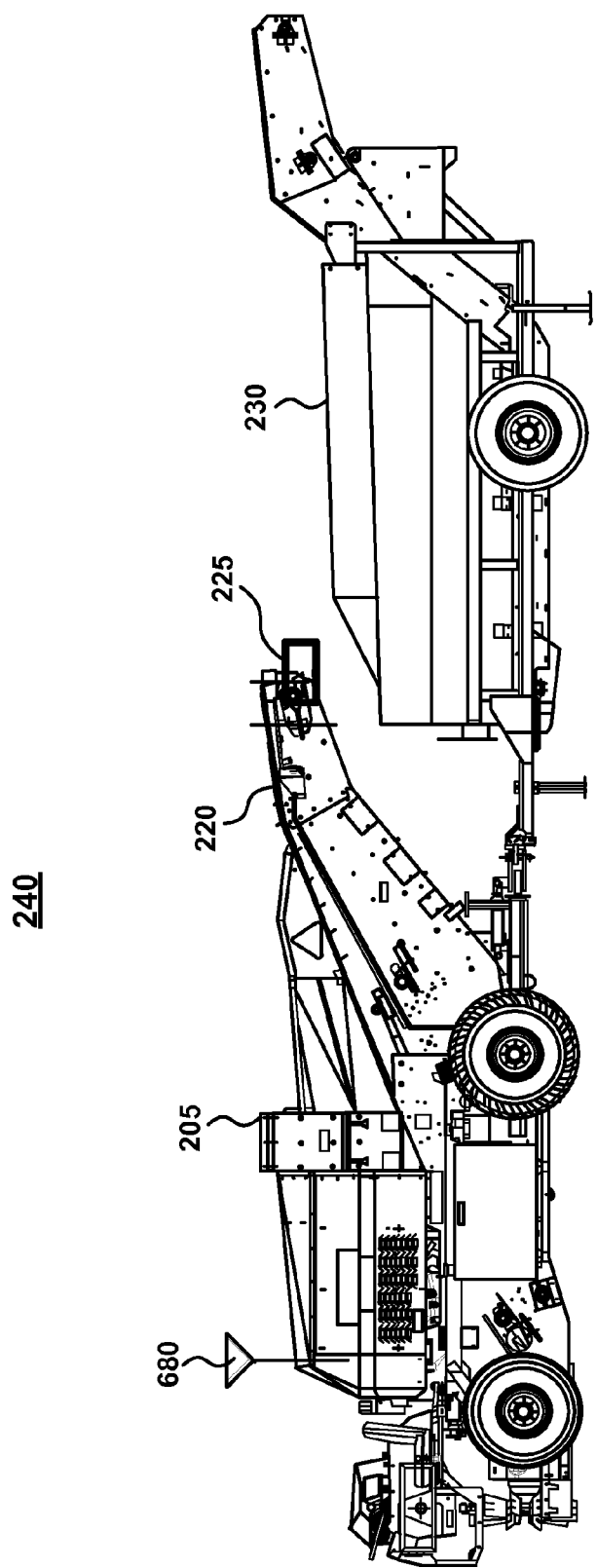
FIG. 2B is a diagram of a crop yield measuring apparatus utilizing a conveyor weighing system, according to another embodiment of the present technology.

With reference now to FIG. 2B, a diagram of a crop yield measuring apparatus 240 is shown according to one embodiment of the present technology. In one embodiment, crop yield measuring apparatus 240 includes a harvester 205, a location determiner GNSS 680, a conveyor 220, an optical device 225 and a storage unit 230.

In a tree-crop harvesting operation, harvester 205 may be a collector vehicle that works in conjunction with a shaker vehicle. For example, the shaker vehicle would operate on one side of a row of trees while the collector vehicle 205 would work on the other side of the tree row. As the shaker shakes the tree, the collector 205 would work in conjunction with the shaker to collect any crops that fall from the tree.

In either case, after the nuts are gathered on the harvester, a storage unit 230, such as a bulk tank or bin, is used to temporarily hold the nuts to keep the harvesters working for an extended period of time. When the storage unit 230 is filled up the crop is moved outside the orchard by periodic unloading equipment.

In one embodiment, the harvesters may be self-propelled or towed by tractors. The storage unit 230 may be a bulk tank, bins or the like. In general, bulk tanks are towed by self-propelled harvesters, or by towed harvesters, which are pulled by tractors. The bins are usually carried by the harvesters. In one embodiment, the crop is continuously transferred to the storage units by means of slanted conveyor 220.

Location determiner 680 utilizes navigation satellite system information to determine position information. In general, the position information is determined in a real-time ongoing manner. Moreover, based on the level of accuracy desired, the position determination can be set to different levels of accuracy. Additional detail regarding location determiner 680 is described with respect to FIG. 6.

In one embodiment, conveyor 220 is utilized to transport the harvested crop from the harvester vehicles 205 to storage unit 230. In one embodiment, the conveyor 220 may include various separation components to separate the harvested crop from other detritus such as branches, leaves and the like, such as shown in FIG. 2A. Storage unit 230 is a storage container for the harvested crops that is drawn behind the harvesting vehicle 200 or 205. At FIGS. 2A and 2B, in one embodiment, optical device 225 is part of a conveyor optical measuring system and is located along and slightly lower than the conveyor 220 and is utilized to count and measure the yield of the crop harvested at a given location. In one embodiment, the optical device measures a volume of the crop as it passes across a conveyor, for example. In one embodiment, optical device 225 is located far enough down conveyor 220 to ensure that most of the detritus is removed and therefore not included in the volume measurements.

In another embodiment, crop yield measuring apparatus 240 may include an embodiment wherein the optical device 225 is coupled directly with components of storage unit 230 instead of harvester vehicle 205.

Figure 2C:
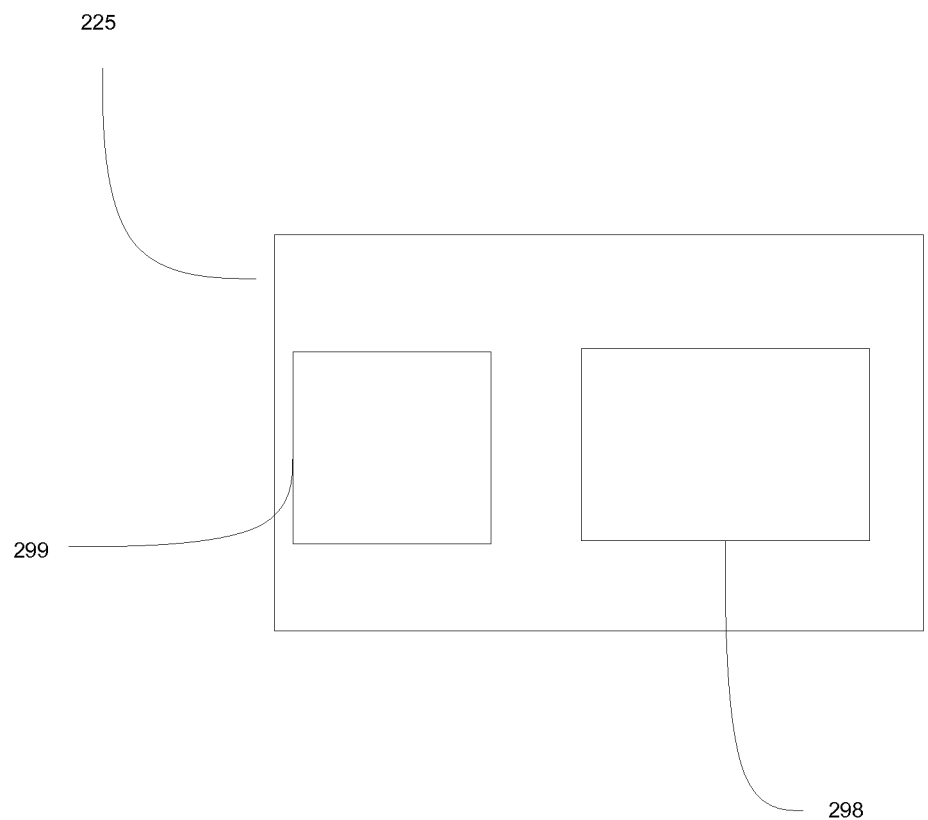
FIG. 2C is a diagram of a close up view of weighing mechanism, according to one embodiment of the present technology.

FIG. 2C illustrates an exemplary optical device 225 that can be used in accordance with embodiments of the present invention. The optical device, in one embodiment includes a light source 299 and an image sensor array 298. In one embodiment, the light source is an infrared light source.

In one embodiment, the optical sensor array 298 is stereoscopic with multiple 2D cameras. In another embodiment, optical sensor array 298 performs real-time active 3D image capturing based on time-of flight technology using photonic mixer devices (PMD). In one embodiment, the optical device includes an array 298 of 64 or more by 48 or more pixels that detect an array of infrared, LEDs 299 that is illuminating the passing crop target. The reflections are measured by the arrays 298 and yield is determined based on this data. The optical device 225 of the present invention can measure the meter volume by the time of flight with this array of a PMD technology. In one embodiment, the optical device 225 performs like a flow meter and in that part, litters per second or a flow base can be determined.

In one embodiment, each pixel of the camera sensor 298 is going to represent an XYZ coordinate. So essentially, the camera has XYZ positioning determination and camera is going to give a Cartesian coordinate for each pixel and the volume is determined by the distance.

Figure 3:
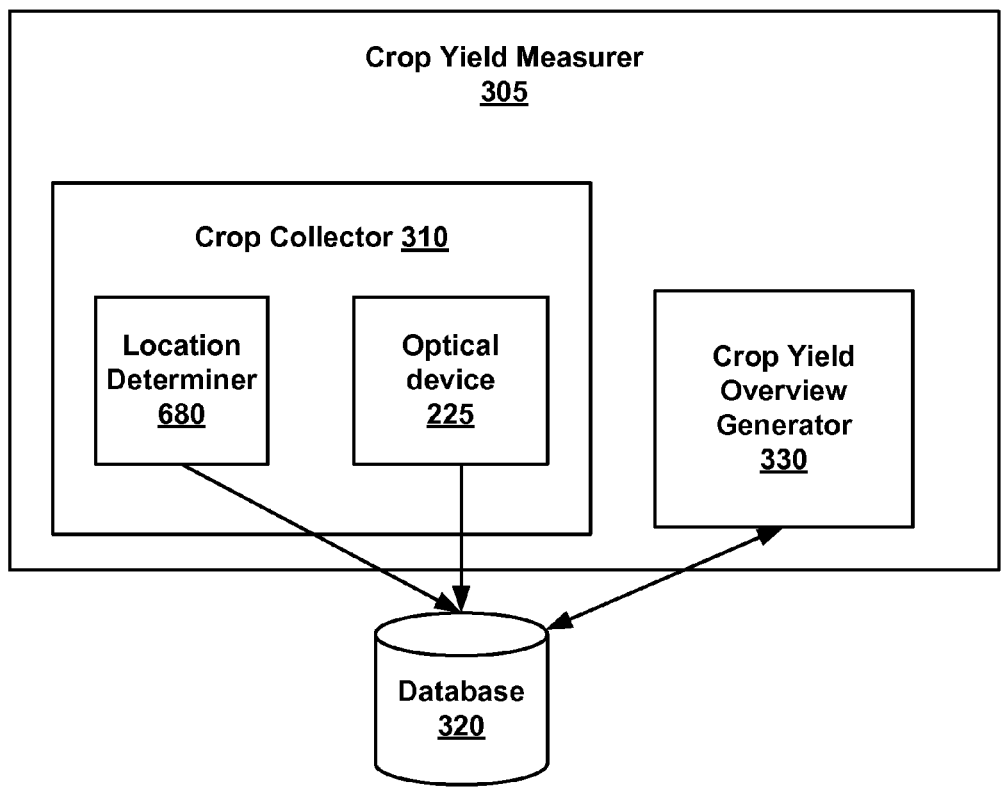
FIG. 3 is a block diagram of a crop yield measuring system, according to one embodiment of the present technology.

With reference now to FIG. 3, a block diagram of a crop yield measuring system 305 is shown according to one embodiment of the present technology. In general, crop yield measuring system 305 includes a crop collector 310 that includes a location determiner 680 and optical device 225. In one embodiment, crop collector 310 is similar to the crop yield measuring apparatus' described in either FIG. 2A or 2B.

Crop yield measuring system 305 also includes a crop yield overview generator 330. In addition, crop yield measuring system 305 also accesses a database 320. In one embodiment, database 320 may be directly coupled with crop yield measuring system 305, however, in another embodiment, database 320 may be a remotely located database 320 which is accessed via a wireless connection. In one embodiment, crop yield information is accessible by a user at database 320.

As described in more detail herein, the crop yield may be determined per plant for every plant in the field of plants, per a row of plants in the field of plants, by sampling one or more of the plants in the field of plants or the like.

Figure 4:
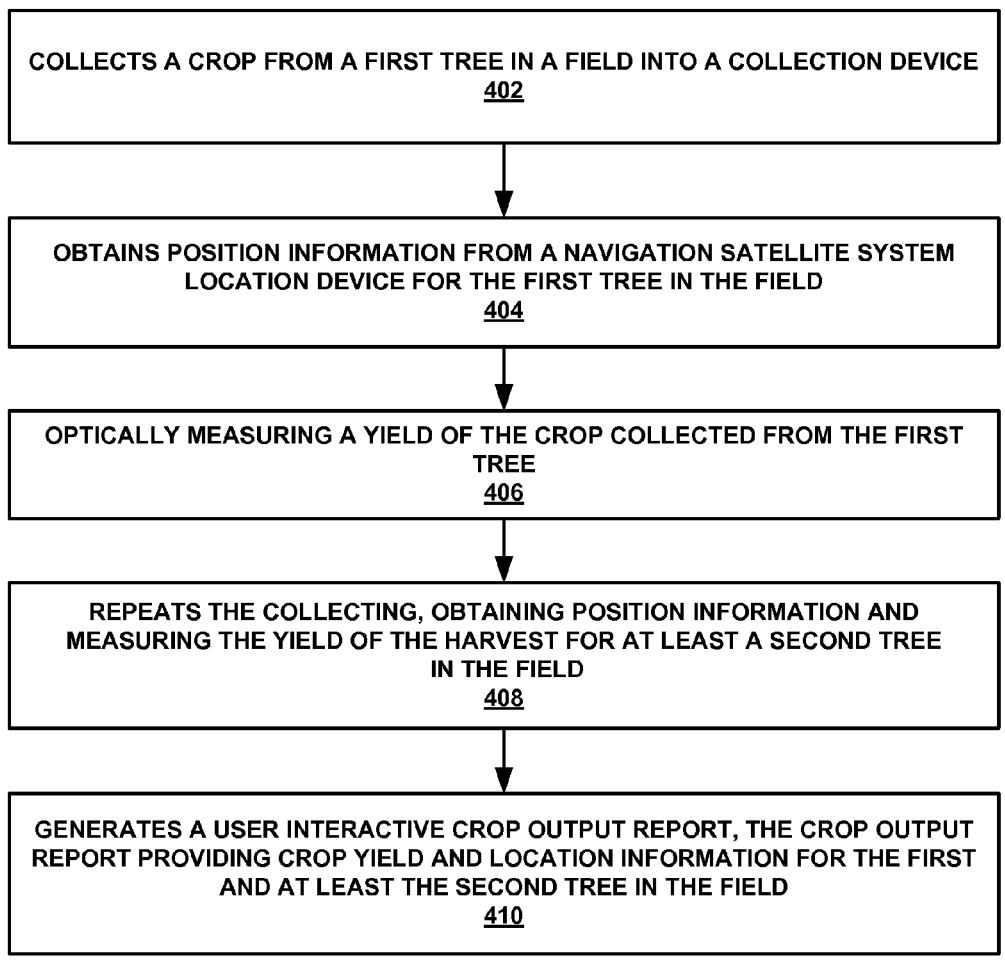
FIG. 4 is a flowchart of a method for measuring crop yield per location, according to one embodiment of the present technology.

With reference now to FIG. 4, a flowchart of a method 400 for measuring crop yield per location is shown according to one embodiment of the present technology.

With reference now to 402 of FIG. 4 and FIG. 2B, one embodiment collects a crop from a first tree in a field into a collection device. For example, as described herein, the collector may include a vehicle 205, a location determiner GNSS 680, a conveyor 220, an optical device 225 and a storage unit 230.

In general, vehicle 205 is a crop harvesting or crop collecting vehicle. In one embodiment, vehicle 205 may be a vehicle that works alone to harvest the crop from a field; such as, for example, a grain harvester. In another embodiment, vehicle 205 may be the collector vehicle in a harvesting group of vehicles.

Referring now to 404 of FIG. 4 and FIGS. 2B and 2C, one embodiment obtains position information from a navigation satellite system location device for the first tree in the field. In one embodiment, location determiner GNSS 680 may be fixedly coupled with the collector vehicle 205, the conveyor 220, the optical device 225, the storage unit 230, or the like. In another embodiment, location determiner GNSS 680 may be a handheld device that is hand portable. In general, fixedly coupled refers to a device that is hard wired into a location and usually receives its power therefrom.

In contrast, a handheld device refers to a device that is usually self-sufficient and has a form factor and size such that it may be carried by a user, such as in a pocket, backpack or the like. Thus, although a handheld device may be coupled with a vehicle, such as to charge the device through an outlet or coupled with the vehicles onboard computer via a USB or other input connection, it is normal to remove or disconnect a handheld device from the vehicle.

Location determiner 680 utilizes navigation satellite system information to determine position information. In general, the position information is determined in a real-time ongoing manner. Moreover, based on the level of accuracy desired, the position determination can be set to different levels of accuracy. Additional detail regarding location determiner 680 is described with respect to FIG. 6.

With reference now to 406 of FIG. 4 and FIG. 2B, one embodiment optically measuring a yield of the crop collected from the first tree. As shown in FIG. 2B, in one embodiment, the conveyor 220 is the location utilized by the measuring system, e.g., optical device 225, for measuring the yield of the crop collected. In one embodiment, optical device 225 performs a volume determination. In one embodiment, the volume can be used to determine a weight determination. In one embodiment, optical device 225 is part of a volume determination mechanism and can determine volume of a crop.

In another embodiment, optical device 225 measures the yield of the crop collected at the storage unit 230. In one embodiment the count and/or volume is determined directly from the cart. In one embodiment, the crop yield metric is determined per plant for every plant in the field. In another embodiment, the crop yield metric is determined per a row of plants in the field. In yet another embodiment, the crop yield metric is determined by sampling one or more of the plants in the field of plants.

For example, in a conveyor 220 yield determining scenario, optical device 225 measures a total volume of the crop transported across the conveyor 220 for a given period of time to generate a gross crop yield for a given location. For example, optical device 225 may begin measuring the yield of crop that passes over the conveyor approximately 1 second after the collecting is commenced at the location. In addition, optical device 225 may conclude the measuring approximately 3 seconds after the collecting is ended at the given location. In one embodiment, by incorporating a delay in the optical counting process, the optical device 225 can more reliably ascertain the yield of the crop harvested at any given location. Although a number of seconds delay is described herein, it should be understood that the delay numbers are provided for clarity. The actual delay may be adjusted or removed depending upon the type of crop being harvested, the speed of harvest, the level of specificity desired, and the like.

For example, if the yield measurement was for a row of crops, optical device 225 would only need to delay long enough at either end of the row to ensure that only the specific row's crop volume was measured. In contrast, if the yield measurement was for each plant in a field, optical device 225 would need to have enough delay before harvesting of the crop on each plant was commenced to ensure that conveyor 220 was relatively clear of any previously harvested crop. Similarly, optical device 225 would need to have enough delay after the harvesting of the crop on each plant was completed to ensure that most of the harvested crops had passed across conveyor 220 and was included in the final volume determined by optical device 225.

Moreover, in yet another embodiment, optical device 225 may perform yield measurements continually throughout the harvesting process. The data from optical device 225 would be stored in database 320 and then later reviewed in conjunction with the location information to determine crop yield per location information. In other words, the desired accuracy may be adjusted to different levels based on preferences such as harvest speed, per crop accuracy, per row accuracy and the like.

In addition, the accuracy may be adjusted per locations throughout the field 100. For example, if a field 100 consisted of 500 trees to be harvested, the desired accuracy may be adjusted for different portions of the field. For example, in an area of younger plants, per tree accuracy may be selected to establish how each tree is producing. In an area of middle lifespan plants, the accuracy may be reduced to a per-row or per-portion of row level to increase the speed of the harvesting or collecting process. Then, in an area of older plants, per tree accuracy may again be selected to establish how each tree is producing.

Of course, the modifications and accuracy described herein may be adjusted in numerous other ways and based on numerous other factors and farmer preferences without cost or modification. For example, a full field per tree accuracy crop yield may be performed only every few years and each in-between harvest may only include row level crop yield accuracy.

Referring now to 408 of FIG. 4 and FIGS. 2A and 2B, one embodiment repeats the collecting, obtaining position information and measuring the yield of the harvest for at least a second tree in the field. In another embodiment, the collecting, obtaining position information and measuring the volume of the harvest is performed for each of n trees in the field. In yet another embodiment, the collecting, obtaining position information and measuring the volume of the harvest is performed for every plant in the field. In another embodiment, the collecting, obtaining position information and measuring the volume of the harvest is performed per a row of plants in the field. In yet another embodiment, the collecting, obtaining position information and measuring the volume of the harvest is performed by sampling one or more of the plants in the field of plants.

With reference now to 410 of FIG. 4 and FIGS. 1, 2A and 2B, one embodiment generates a user interactive crop output report, the crop output report providing crop yield and location information for the first tree 101 and at least the second tree 102 in the field. In another embodiment, the crop output report provides crop yield and location information for every plant in the field. In a further embodiment, the crop output report provides crop yield and location information for one or more rows of plants in the field e.g., 110-n. In yet another embodiment, the crop output report provides crop yield and location information for one or more different field locations, e.g., 152 and 153.

In one embodiment, the user interactive crop output report is similar to a map of the field of plants. In addition to generating the user interactive crop output report, one embodiment utilizes the sampling of one or more of the plants in the field of plants to generate a future harvesting plan for the field of plants. Another embodiment utilizes previous known plant information in conjunction with the sampling of one or more of the plants in the field of plants to generate the future harvesting plan for the field of plants.

In general, previous known plant information may include, but is not necessarily limited to, information such as: previous harvest information, age of a plant, location of a plant with respect to water resources, user observable input, animal activity, plant health and known statistical data about the plant.

In one embodiment, the user interactive crop output report may appear very similar to field 100 of FIG. 1 and include information that is capable of being provided at different levels. Moreover, field 100 may be displayed on a graphical user interface such that a user can zoom into or out of field 100 to obtain a big picture overview as well as a small picture close up view.

For example, if a user wanted to view a pistachio field 100 including hundreds of trees, the user may first view the entire field 100 at a level wherein individual plants may not be readily identified. In this case, the row and area of interest information may be most easily obtained.

However, the user may then zoom in on a specific location to generate a view of field 100 that would allow for information about individual plants to be obtained. Thus, the level of view, amount of information displayed, and various other user optional metrics may be adjusted and modified to provide a user with a desired view of field 100. In general, the adjustments and modifications may be predetermined by a user or may be adjustable via touch screens, drop down menus, keystrokes, cursor movements, input buttons, and the like.

For example, with respect to the crop yield level per portion of a field, the field location level may include location information in a first portion 153 of the field that provide significantly better crop yield. Similarly, the field location level may include information in a second portion 152 of the field that provides significantly worse crop yield than in other locations of the same field 100. Moreover, there may be a number of portions of the field 100 that provide significantly better crop yield in differing locations that may be spread throughout the field. In one embodiment, significantly better or worse crop yield is a metric that may be based on the average crop yield per plant in a field, on a statistical average for the plant, or the like.

For example, if 100 plants in a field were measured for crop yield, the resulting crop yield would report would probably follow a bell curve shape. On one end of the curve would be the plant that had the lowest crop yield and on the other end of the curve would be a plant that had the highest crop yield. The rest of the plants would fall in between these two plants. In one statistical model, the mean would be calculated to provide a statistical central tendency. Moreover, a metric such as a standard deviation may be used to select plants with differing crop yield. For example, if the per plant crop yield was close to "normal" approximately 68% of the scores in the sample would fall within one standard deviation of the mean. Similarly, approximately 95% of the scores in the sample would fall within two standard deviations of the mean. Further, approximately 99% of the scores in the sample would fall within three standard deviations of the mean.

Depending upon the desired metric to be obtained, in one embodiment, the significantly better crop yield per plant may be those plants that were in the group outside of the first standard deviation in the more crop yield direction. Similarly, the significantly worse crop yield per plant may be those plants that were in the group outside of the first standard deviation in the less crop yield direction. In another embodiment, the metric for distinction may be based on those plants outside of the second standard deviation or the like.

Furthermore, the crop yield overview may provide the plant crop yield information in a user interface that includes one or more of: the specific crop yield values measured, a visual or other user identifiable marking that would show which plants or locations fell within which standard deviation of the mean, and the like. Moreover, the plant crop yield information may also provide feedback based on the resulting statistical information. For example, the feedback may include plants or areas of plants shown in green to illustrate good producers, plants or areas of plants shown in yellow to illustrate plants or areas of plants outside of the first standard deviation but inside the second (or one and a half) standard deviations and plants or areas of plants shown in red to illustrate plants that were outside of the second standard deviation. In one embodiment, this feedback may be used to establish a harvesting route, a replant strategy, or the like.

For example, assuming an almond tree has an average production life span of 20-25 years and does not begin producing for the first 3-4 years of life after planting. The field in the following example has 200 almond trees which were planted over the span of 30 years, if the field were managed purely on the average model, the field plan may include removing any trees that are 22 year old and replace them with new plants.

In contrast, when utilizing the crop yield overview, the almond trees that are less than 25 years old may be shown to be producing a crop yield that is within the first standard deviation. Meanwhile, the trees that are 27 years old may be shown to fall outside of the first standard deviation. As such, the field plan may be modified to include removing trees after their $26^{th}$ year. In so doing, the almond field will have gained 4 years of almond producing per tree, which would be a gain in value per tree.

Similarly, the crop yield overview may show some younger almond trees that are falling outside of the first standard deviation. In one embodiment, the field plan is modified to remove the under-producing trees and replace them with new trees. In another embodiment, the under-producing almond trees may be monitored for a second harvest to determine if the crop yield results remain consistently low. If so, then the field plan may be modified to remove the under-producing almond trees and replacing them with new almond trees.

Another example illustrating the value of using the embodiments described herein is a sugar cane crop. In general, Cane has an average production life span of 5 to 10 years even though it is harvested every year. Different soil types and environments can cause different species to be productive for longer or shorter periods. By performing the location based year-to-year comparison as described herein, a grower would be able to monitor productivity increases or declines on certain varieties in certain parts of the field. Thus, utilizing the crop yield overview will provide insight that can be utilized to help a farmer make replanting decisions based on actual performance of the cane crop.

For example, if the sugarcane is flourishing in a certain portion of the field, the cane would be left for additional years of harvest. Similarly, if the sugarcane was doing poorly in another portion of the field, the cane could be removed and replaced. In one embodiment, the cane may be replaced with a different variety based on metrics gathered about the portion of the field. For example, if the portion of the field is dryer than other areas, a species of sugarcane that was known to produce in dryer soil may be utilized.

As such, the overall management of the field is changed from an average age or visual inspection type of field management to a crop yield type of field management. In other words, field managements would be crop yield focused as low producer trees would be removed while normal and high producing trees would be kept for additional seasons. In so doing, it is appreciable that crop yield per field would be increased while plant replacement costs would be based on production.

Calibration of the Optical Sensor

The following is one embodiment for calibration of the optical sensor. In one embodiment, the calibration process may be performed in the factory. In one embodiment, an approximate calibration factor is obtained based on the photo cell sensitivity (mV/V), the intermediate amplifier stage gains, and the monitored and controlled conveyor speed. In addition to factory calibration, in one embodiment a calibration validation is performed in the field, or in the lab. The calibration validation may be performed with different techniques including, but not limited to, the utilization of pre-weighted bags of materials, bulk products with calibrated scales, harvested bulk material calibrated with the processing plant scales, bulk or harvested materials measured with calibrated weigh wagons, and the like.

Factory Calibration

In one embodiment, the factory calibration factor converts counts per time into mass per time of material passing through the sensor. In other words, it converts counts/s into kg/s, or lb/s. In one embodiment, the total mass of the measured product is determined during the time period the conveyor operates.

In one embodiment, the optical device gives a volume measurement per period of time and per location. This volume determination needs to be converted into a weight in some cases to perform a weight yield per location. A calibration between a volume of crop and a weight of crop can be made in one embodiment. In one embodiment, the weight of the crop is also determined and compared against the recorded volume for that particular harvest. A volume to weight calibration can be made based on multiple comparisons between weight and volume.

The sum of all mass flow readings (kg/s) is multiplied by the total time period to provide the total mass of the material as measured by the conveyor sensor. Another embodiment averages all discrete volume count rates that pass through the unit and multiplies them by the total time of the measurement to obtain the total measured volume.

As provided above, measuring the actual weight of the crop and comparing the weight to the recorded volume allows a real-time correlation between weight and volume such that volume can be used to determine and approximate crop yield weight.

Calibrated Pre-Weighed Bags (or Objects with Known Weights)

In one embodiment, the minimum measurement range of the conveyor sensor is a zero rate, or tare. The maximum flow rate for the conveyor sensor is determined by the factory and is associated to the particular sensor model. A particular conveyor sensor model can only handle a maximum amount of flow rate through it (Mx). One embodiment of the calibration process utilizes the following procedure.

Multiply Mx by the approximate testing time period. A 20 kg/s Mx times a 5 s testing period will require a load 100 kg of bags approximately evenly fed into the conveyor during the time period.

Run the conveyor sensor, start recording the sensor mass flow readings and start the time counter. Deliver the bags onto the conveyor sensor and stop recording after the last bag goes through the sensor and then repeat the process for one or more smaller loads. For example, using 20, 40, 60 and 80 percent loads of Mx.

One embodiment plots the true total volume divided by the total measured time versus the average mass flow rate reported by the sensor and then uses the slope of the fitted line to correct the factory calibrated factor. When properly calibrated there should be little or no distinction between the slope from the field and factory calibrations.

2.3—Calibrated Processing Plant Scales used with Harvested Crop

In one embodiment, during normal harvesting operations, the calibration can be checked by logging volume flow rates by using the conveyor sensor, and recording the total time used to harvest a full truck, or trailer load of harvested crop and record the net load of crop delivered to the processing plant.

In one embodiment, the process is repeated a number of times and a plot of the volume flow rates obtained with the sensor versus the rates obtained by using the data from a scale of the processing plant. The results can be used to adjust the factory calibration factor.

Calibrated Weigh Wagon Used with Harvested Crop Material

In one embodiment, a relatively homogeneous plot is utilized. For example, in case of almonds, one row of evenly distributed material from the orchard floor can be used.

One embodiment starts recording the time counter and the volume flow rates measured by the sensor. In addition, a zero ground speed is used to record the tare for a given time and then stops the recording.

The harvester is then driven at 20 percent of maximum ground speed for a period of time and the data is recorded again. The machine and the recording is then stopped and the harvested material is unloaded into the weigh wagon where the total volume is measured. The total volume is divided by the time to determine the volume flow rate.

In one embodiment, the process is repeated a number of times at different percentages of the maximum operating ground speed. A plot of the volume flow rate recorded by the sensor versus the true rate measured by the weigh wagon and time counter is generated. The slope of a fitted line is then utilized to correct the factory calibrated factor.

Periodic Zero Readings

In one embodiment, the weighing belt should be periodically checked to ensure there is no conveyor buildup of extraneous materials such as dirt or the like. In addition, the weighing belt should be periodically inspected to ensure no parts of the conveyor have been broken or are separated from the unit, such as belt lugs. In one embodiment, since the belt is short, the tare can be periodically checked when the main feeding conveyor belt is not conveying material to the weighing unit. This operation can be automated. The net volume of the conveyor can also be recorded as a check to ensure that the tare of the system does not change substantially with time; or to determine if an adjusted tare should be applied.

Regular Operation after Calibration

In one embodiment, once the sensor is calibrated, the weighing system will start logging data and geo-referenced GPS position to associate the harvested mass flow rate data, integrated for a small period of time and associated to location. Alternatively, the mass flow rate associated with a particular tree can be isolated, integrated and plotted per tree basis.

Computer System

Figure 5:
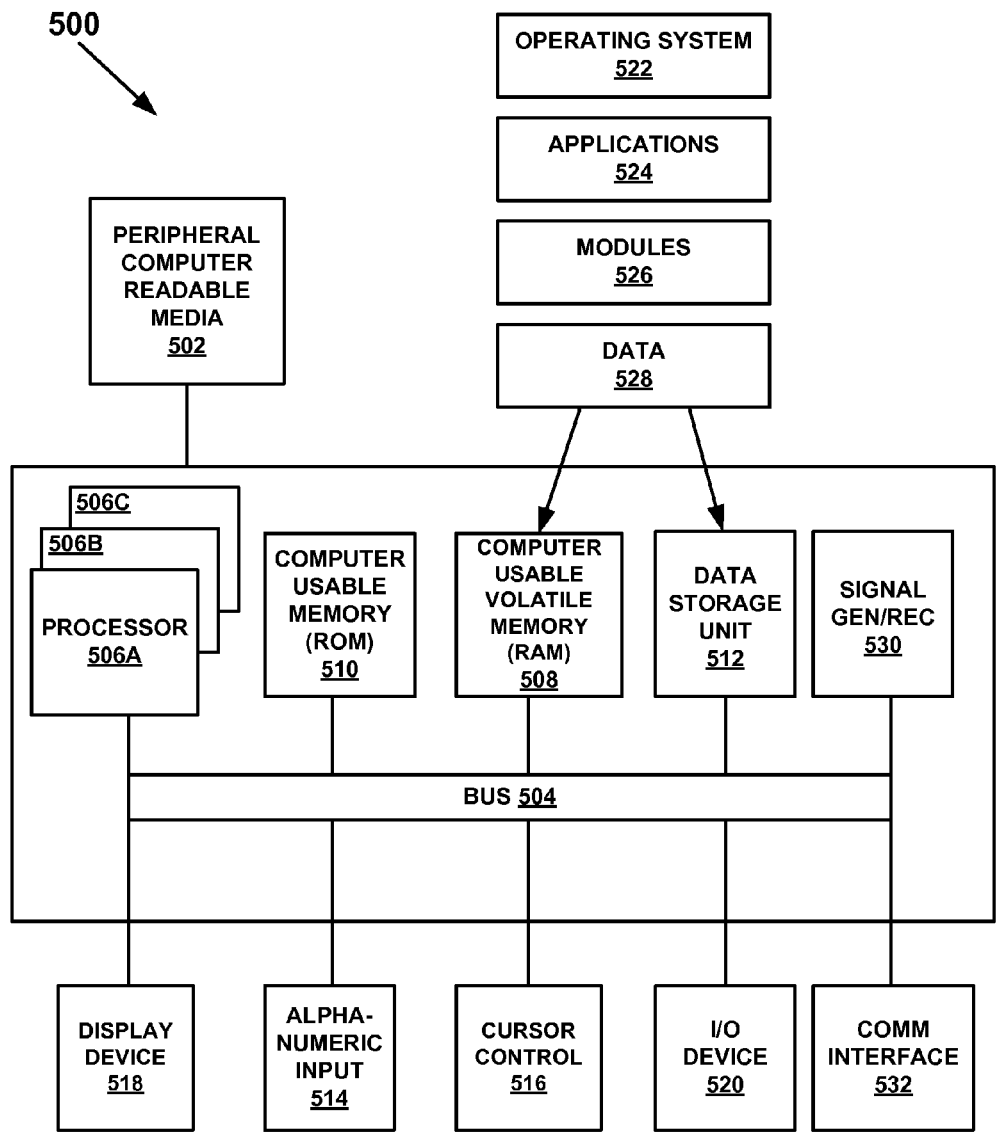
FIG. 5 is a block diagram of an example computer system upon which embodiments of the present technology may be implemented.

With reference now to FIG. 5, portions of the technology for providing a communication composed of non-transitory computer-readable and computer-executable instructions that reside, for example, in non-transitory computer-usable storage media of a computer system. That is, FIG. 5 illustrates one example of a type of computer that can be used to implement embodiments of the present technology. FIG. 5 represents a system or components that may be used in conjunction with aspects of the present technology. In one embodiment, some or all of the components of FIG. 1 or FIG. 3 may be combined with some or all of the components of FIG. 5 to practice the present technology.

FIG. 5 illustrates an example computer system 500 used in accordance with embodiments of the present technology. It is appreciated that system 500 of FIG. 5 is an example only and that the present technology can operate on or within a number of different computer systems including general purpose networked computer systems, embedded computer systems, routers, switches, server devices, user devices, various intermediate devices/artifacts, stand-alone computer systems, mobile phones, personal data assistants, televisions and the like. As shown in FIG. 5, computer system 500 of FIG. 5 is well adapted to having peripheral computer readable media 502 such as, for example, a floppy disk, a compact disc, and the like coupled thereto.

System 500 of FIG. 5 includes an address/data bus 504 for communicating information, and a processor 506A coupled to bus 504 for processing information and instructions. As depicted in FIG. 5, system 500 is also well suited to a multi-processor environment in which a plurality of processors 506A, 506B, and 506C are present. Conversely, system 500 is also well suited to having a single processor such as, for example, processor 506A. Processors 506A, 506B, and 506C may be any of various types of microprocessors. System 500 also includes data storage features such as a computer usable volatile memory 508, e.g. random access memory (RAM), coupled to bus 504 for storing information and instructions for processors 506A, 506B, and 506C.

System 500 also includes computer usable non-volatile memory 510, e.g. read only memory (ROM), coupled to bus 504 for storing static information and instructions for processors 506A, 506B, and 506C. Also present in system 500 is a data storage unit 512 (e.g., a magnetic or optical disk and disk drive) coupled to bus 504 for storing information and instructions. System 500 also includes an optional alphanumeric input device 514 including alphanumeric and function keys coupled to bus 504 for communicating information and command selections to processor 506A or processors 506A, 506B, and 506C. System 500 also includes an optional cursor control device 516 coupled to bus 504 for communicating user input information and command selections to processor 506A or processors 506A, 506B, and 506C. System 500 of the present embodiment also includes an optional display device 518 coupled to bus 504 for displaying information.

Referring still to FIG. 5, optional display device 518 of FIG. 5 may be a liquid crystal device, cathode ray tube, plasma display device or other display device suitable for creating graphic images and alpha-numeric characters recognizable to a user. Optional cursor control device 516 allows the computer user to dynamically signal the movement of a visible symbol (cursor) on a display screen of display device 518. Many implementations of cursor control device 516 are known in the art including a trackball, mouse, touch pad, joystick or special keys on alpha-numeric input device 514 capable of signaling movement of a given direction or manner of displacement. Alternatively, it will be appreciated that a cursor can be directed and/or activated via input from alpha-numeric input device 514 using special keys and key sequence commands.

System 500 is also well suited to having a cursor directed by other means such as, for example, voice commands. System 500 also includes an I/O device 520 for coupling system 500 with external entities. For example, in one embodiment, I/O device 520 is a modem for enabling wired or wireless communications between system 500 and an external network such as, but not limited to, the Internet. A more detailed discussion of the present technology is found below.

Referring still to FIG. 5, various other components are depicted for system 500. Specifically, when present, an operating system 522, applications 524, modules 526, and data 528 are shown as typically residing in one or some combination of computer usable volatile memory 508, e.g. random access memory (RAM), and data storage unit 512. However, it is appreciated that in some embodiments, operating system 522 may be stored in other locations such as on a network or on a flash drive; and that further, operating system 522 may be accessed from a remote location via, for example, a coupling to the internet. In one embodiment, the present technology, for example, is stored as an application 524 or module 526 in memory locations within RAM 508 and memory areas within data storage unit 512. The present technology may be applied to one or more elements of described system 500.

System 500 also includes one or more signal generating and receiving device(s) 530 coupled with bus 504 for enabling system 500 to interface with other electronic devices and computer systems. Signal generating and receiving device(s) 530 of the present embodiment may include wired serial adaptors, modems, and network adaptors, wireless modems, and wireless network adaptors, and other such communication technology. The signal generating and receiving device(s) 530 may work in conjunction with one or more communication interface(s) 532 for coupling information to and/or from system 500. Communication interface 532 may include a serial port, parallel port, Universal Serial Bus (USB), Ethernet port, antenna, or other input/output interface. Communication interface 532 may physically, electrically, optically, or wirelessly (e.g. via radio frequency) couple system 500 with another device, such as a cellular telephone, radio, or computer system.

The computing system 500 is only one example of a suitable computing environment and is not intended to suggest any limitation as to the scope of use or functionality of the present technology. Neither should the computing environment 500 be interpreted as having any dependency or requirement relating to any one or combination of components illustrated in the example computing system 500.

The present technology may be described in the general context of computer-executable instructions, such as program modules, being executed by a computer. Generally, program modules include routines, programs, objects, components, data structures, etc., that perform particular tasks or implement particular abstract data types. The present technology may also be practiced in distributed computing environments where tasks are performed by remote processing devices that are linked through a communications network. In a distributed computing environment, program modules may be located in both local and remote computer-storage media including memory-storage devices.

GNSS Receiver

Figure 6:
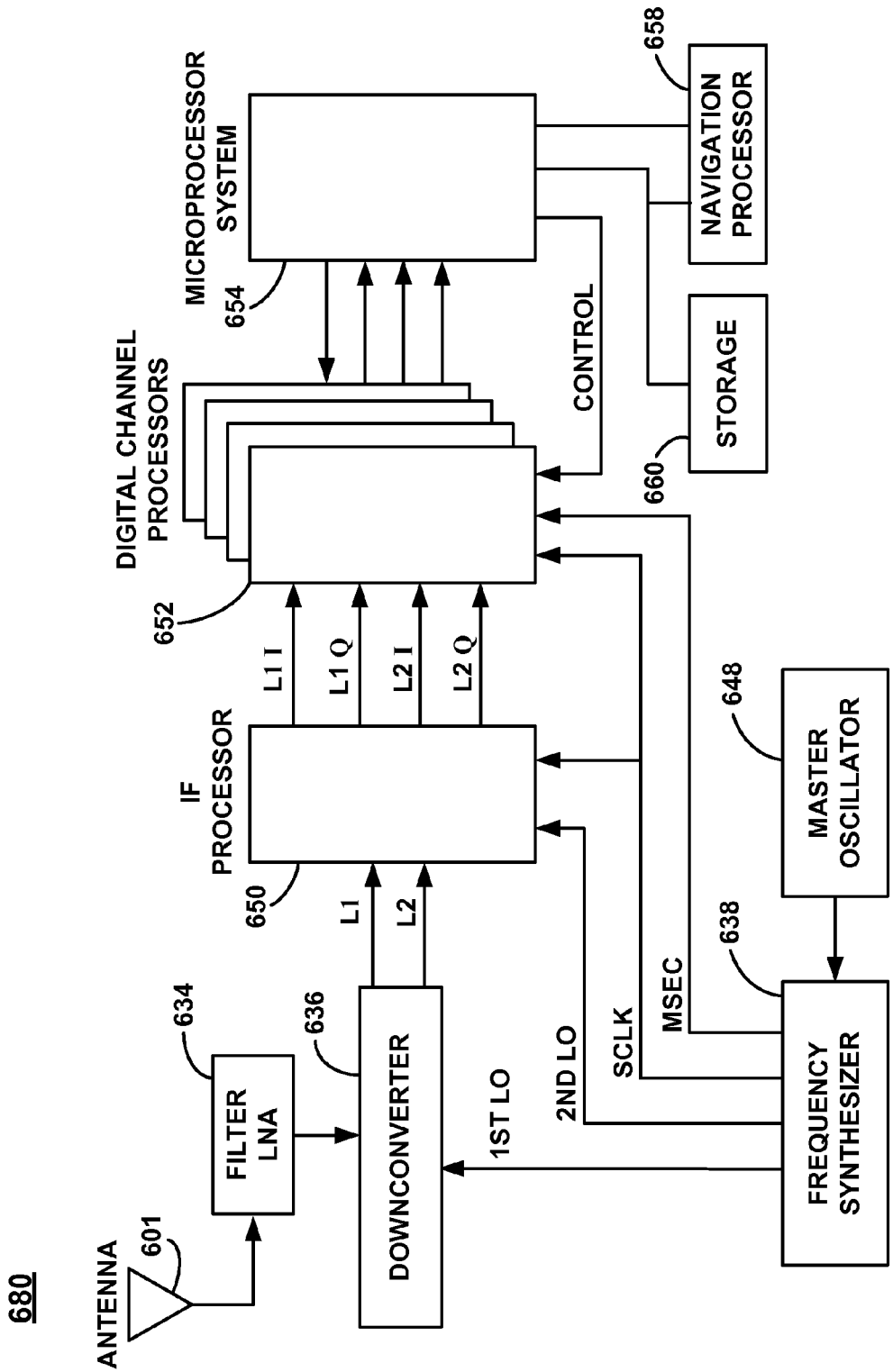
FIG. 6 is a block diagram of an example global navigation satellite system (GNSS) receiver which may be used in accordance with one embodiment of the present technology.

With reference now to FIG. 6, a block diagram is shown of an embodiment of an example GNSS receiver which may be used in accordance with various embodiments described herein. In particular, FIG. 6 illustrates a block diagram of a GNSS receiver in the form of a general purpose GPS receiver 680 capable of demodulation of the L1 and/or L2 signal(s) received from one or more GPS satellites. For the purposes of the following discussion, the demodulation of L1 and/or L2 signals is discussed. It is noted that demodulation of the L2 signal(s) is typically performed by "high precision" GNSS receivers such as those used in the military and some civilian applications. Typically, the "consumer" grade GNSS receivers do not access the L2 signal(s). Further, although L1 and L2 signals are described, they should not be construed as a limitation to the signal type; instead, the use of the L1 and L2 signal(s) is provided merely for clarity in the present discussion.

Although an embodiment of a GNSS receiver and operation with respect to GPS is described herein, the technology is well suited for use with numerous other GNSS signal(s) including, but not limited to, GPS signal(s), Glonass signal(s), Galileo signal(s), and Compass signal(s).

The technology is also well suited for use with regional navigation satellite system signal(s) including, but not limited to, Omnistar signal(s), StarFire signal(s), Centerpoint signal(s), Beidou signal(s), Doppler orbitography and radio-positioning integrated by satellite (DORIS) signal(s), Indian regional navigational satellite system (IRNSS) signal(s), quasi-zenith satellite system (QZSS) signal(s), and the like.

Moreover, the technology may utilize various satellite based augmentation system (SBAS) signal(s) such as, but not limited to, wide area augmentation system (WAAS) signal(s), European geostationary navigation overlay service (EGNOS) signal(s), multi-functional satellite augmentation system (MSAS) signal(s), GPS aided geo augmented navigation (GAGAN) signal(s), and the like.

In addition, the technology may further utilize ground based augmentation systems (GBAS) signal(s) such as, but not limited to, local area augmentation system (LAAS) signal(s), ground-based regional augmentation system (GRAS) signals, Differential GPS (DGPS) signal(s), continuously operating reference stations (CORS) signal(s), and the like.

Although the example herein utilizes GPS, the present technology may utilize any of the plurality of different navigation system signal(s). Moreover, the present technology may utilize two or more different types of navigation system signal(s) to generate location information. Thus, although a GPS operational example is provided herein it is merely for purposes of clarity.

In one embodiment, the present technology may be utilized by GNSS receivers which access the L1 signals alone, or in combination with the L2 signal(s). A more detailed discussion of the function of a receiver such as GPS receiver 680 can be found in U.S. Pat. No. 5,621,426. U.S. Pat. No. 5,621,426, by Gary R. Lennen, entitled "Optimized processing of signals for enhanced cross-correlation in a satellite positioning system receiver," incorporated by reference which includes a GPS receiver very similar to GPS receiver 680 of FIG. 6.

In FIG. 6, received L1 and L2 signal is generated by at least one GPS satellite. Each GPS satellite generates different signal L1 and L2 signals and they are processed by different digital channel processors 652 which operate in the same way as one another. FIG. 6 shows GPS signals (L1=1575.42 MHz, L2=1227.60 MHz) entering GPS receiver 680 through a dual frequency antenna 601. Antenna 601 may be a magnetically mountable model commercially available from Trimble® Navigation of Sunnyvale, Calif., 94085. Master oscillator 648 provides the reference oscillator which drives all other clocks in the system. Frequency synthesizer 638 takes the output of master oscillator 648 and generates important clock and local oscillator frequencies used throughout the system. For example, in one embodiment frequency synthesizer 638 generates several timing signals such as a 1st LO1 (local oscillator) signal 1400 MHz, a 2nd LO2 signal 175 MHz, a (sampling clock) SCLK signal 25 MHz, and a MSEC (millisecond) signal used by the system as a measurement of local reference time.

A filter/LNA (Low Noise Amplifier) 634 performs filtering and low noise amplification of both L1 and L2 signals. The noise figure of GPS receiver 680 is dictated by the performance of the filter/LNA combination. The downconverter 636 mixes both L1 and L2 signals in frequency down to approximately 175 MHz and outputs the analogue L1 and L2 signals into an IF (intermediate frequency) processor 30. IF processor 650 takes the analog L1 and L2 signals at approximately 175 MHz and converts them into digitally sampled L1 and L2 inphase (L1 I and L2 I) and quadrature signals (L1 Q and L2 Q) at carrier frequencies 420 KHz for L1 and at 2.6 MHz for L2 signals respectively.

At least one digital channel processor 652 inputs the digitally sampled L1 and L2 inphase and quadrature signals. All digital channel processors 652 are typically identical by design and typically operate on identical input samples. Each digital channel processor 652 is designed to digitally track the L1 and L2 signals produced by one satellite by tracking code and carrier signals and to form code and carrier phase measurements in conjunction with the microprocessor system 654. One digital channel processor 652 is capable of tracking one satellite in both L1 and L2 channels.

Microprocessor system 654 is a general purpose computing device which facilitates tracking and measurements processes, providing pseudorange and carrier phase measurements for a navigation processor 658. In one embodiment, microprocessor system 654 provides signals to control the operation of one or more digital channel processors 652.

Navigation processor 658 performs the higher level function of combining measurements in such a way as to produce position, velocity and time information for the differential and surveying functions. Storage 660 is coupled with navigation processor 658 and microprocessor system 654. It is appreciated that storage 660 may comprise a volatile or non-volatile storage such as a RAM or ROM, or some other computer readable memory device or media.

One example of a GPS chipset upon which embodiments of the present technology may be implemented is the Maxwell™ chipset which is commercially available from Trimble® Navigation of Sunnyvale, Calif., 94085.

Although the subject matter is described in a language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for measuring crop yield for a plurality of trees, comprising:
   collecting a first crop from a first tree in a field into a collection device, wherein collecting includes using a crop collector comprising:
      a navigation satellite system location determiner for determining position information for trees in the field;
      a conveyor for transferring crops to a storage unit and for separating crops from detritus; and
      an optical measuring system for optically determining volume of harvested crops transferred using the conveyor, wherein the optical measuring system includes an optical sensor array for performing real-time stereoscopic imaging of the harvested crop or real-time 3D time-of-flight imaging of the harvested crop;
   obtaining first position information for the first tree in the field using the navigation satellite system location determiner;
   optically measuring a first volume of the first crop collected from the first tree using the optical measuring system by performing real-time stereoscopic imaging of the first crop collected from the first tree or real-time 3D time-of-flight imaging of the first crop collected from the first tree;
   storing the first position information and the first volume to a database;
   collecting a second crop from a second tree in the field into the collection device using the crop collector;
   obtaining second position information for the second tree in the field using navigation satellite system location determiner;
   optically measuring a second volume of the second crop collected from the second tree using the optical measuring system by performing real-time stereoscopic imaging of the second crop collected from the second tree or real-time 3D time-of-flight imaging of the second crop collected from the second tree:
   storing the second position information and the second volume to the database;
   generating a user interactive crop output report using the first position information, the second position information, the first volume, and the second volume stored in the database, wherein the user interactive crop output report provides crop yield and location information for at least the first tree and the second tree;
   generating a display of the user interactive crop output report on a graphical user interface, wherein the graphical user interface is configured to provide crop yield and position information at a plurality of different levels including a first level depicting a view of the field in its entirety and a second level depicting individual trees in the field;
   receiving input corresponding to a first command to zoom out the user interactive crop output report to display the first level;
   modifying the display of the user interactive crop output report to provide yield and position information for the first level;
   receiving input corresponding to a second command to zoom in the user interactive crop output report to display the second level; and
   modifying the display of the user interactive crop output report to provide yield and position information for the second level.

2. The method of claim 1 further comprising:
   repeating the collecting, obtaining position information and measuring the volume of crops for one or more additional trees in the field; and
   generating the crop output report providing crop yield and location information per tree for the one or more additional trees in the field.

3. The method of claim 1 wherein the optical measuring system is arranged to optically measure volume of collected crop as the crop passes across the conveyor.

4. The method of claim 1 further comprising:
   optically measuring a total volume of the crop transported across the conveyor for a period of time to generate a gross crop volume for a location.

5. The method of claim 1 further comprising:
   beginning said optically measuring a volume after collecting is commenced at a particular location; and
   concluding said optically measuring the volume after collecting is ended at the particular location.

6. The method of claim 1 further comprising:
   utilizing a cart measuring system for measuring the volume of the crop collected.

7. A crop yield measurer comprising:
   a crop collector for a field of crops, said crop collector comprising:
      a navigation satellite system location determiner to determine location information at periodic times during a crop collection process;
      a conveyor for transferring crops to a storage unit and for separating crops from detritus; and
      an optical measuring system for optically determining volume of collected crops transferred using the conveyor at the periodic times during the crop collection process, wherein the optical measuring system includes an optical sensor array for performing real-time stereoscopic imaging of the collected crops or real-time 3D time-of-flight imaging of the collected crops,
      wherein, during operation and at the periodic times, the crop collector obtains location information associated with a collected crop using the navigation satellite system location determiner, separates the collected crop from detritus and transfers the collected crop to a storage unit using the conveyor, and optically measures volume of the collected crop using the optical measuring system by performing real-time stereoscopic imaging of the collected or real-time 3D time-of-flight imaging of the collected crop;

a database for storing the location information and the volume at the periodic times during the crop collection process; and a crop yield overview generator to provide a user interactive crop yield per location overview for the field of crops based on the location information and volume stored at the database, wherein the interactive crop yield per location overview is provided in a user interface configured to provide crop yield and location information at a plurality of different levels including a first level depicting a view of the field of crops in its entirety and a second level depicting individual plants in the field, wherein the user interface is configured to receive user input for zooming the interactive crop yield per location overview to the first level or the second level, and wherein the crop yield overview generator is configured to modify the user interface to provide yield and position interface for the first level or the second level based on the input.

8. The crop yield measurer of claim 7 wherein the crop yield is determined per plant for every plant in the field of crops.

9. The crop yield measurer of claim 7 wherein the crop yield is determined per a row of plants in the field of crops.

10. The crop yield measurer of claim 7 wherein the crop yield is determined by sampling one or more plants in the field of crops.

11. The crop yield measurer of claim 7 wherein the conveyor determines a weight of the collected crops.

12. The crop yield measurer of claim 7 wherein the optical sensor array comprises one or more optical cameras.

13. A method for determining crop yield for a field of plants, comprising:

receiving locations corresponding to crops harvested from a field of plants using a crop collector, wherein the locations are determined using a navigation satellite system location device;

receiving volume measurements for the crops harvested from the field of plants and separated from detritus, wherein the volume measurements are determined using an optical measuring system including an optical sensor array for performing real-time stereoscopic imaging of the crops harvested from the field of plants or real-time 3D time-of-flight imaging of the crops harvested from the field of plants;

storing the locations and the volume measurements to a database;

generating a user interactive crop output map of the field of plants using the locations and the volume measurements stored in the database, wherein the user interactive crop output map comprises crop information including location and volume; and generating a display of the user interactive crop output map on a graphical user interface, wherein the graphical user interface is configured to provide the locations and the volume measurements at a plurality of different levels including a first level depicting a view of the field of plants in its entirety and a second level depicting individual plants in the field;

receiving input corresponding to a first command to zoom out the user interactive crop output map to display the first level;

modifying the display of the user interactive crop output map to provide the locations and the volume measurements for the first level;

receiving input corresponding to a second command to zoom in the user interactive crop output map to display the second level; and modifying the display of the user interactive crop output map to provide the locations and the volume measurements for the second level.

14. The method of claim 13, further comprising generating a crop yield metric using the volume measurements, wherein the crop yield metric is determined per plant for every plant in the field.

15. The method of claim 13, further comprising generating a crop yield metric using the volume measurements, wherein the crop yield metric is determined per a row of plants in the field.

16. The method of claim 13, further comprising generating a crop yield metric using the volume measurements, wherein the crop yield metric is determined by sampling one or more of the plants in the field of plants.

17. The method of claim 16 further comprising:
generating a future harvesting plan for the field of plants, wherein generating the future harvesting plan includes using sampling of one or more of the plants in the field of plants.

18. The method of claim 17 further comprising:
generating a future harvesting plan for the field of plants, wherein generating the future harvesting plan includes using previous known plant information and the sampling of one or more of the plants in the field of plants.

19. The method of claim 18 wherein the previous known plant information is selected from the group consisting of: previous harvest information, age of plant, location of plant with respect to water resources, user observable input, animal activity and plant health.

20. The method of claim 13, wherein the locations determined using the navigation satellite system location device are obtained using one or more position signal(s) selected from the group consisting of: global navigation satellite system (GNSS) signal(s), regional navigation satellite system signal(s), satellite based augmentation system (SBAS) signal(s), and ground based augmentation systems (GBAS) signal(s).

21. The method of claim 20 wherein the GNSS signal(s) are selected from the group consisting of: GPS signal(s), Glonass signal(s), Galileo signal(s), and Compass signal(s).

22. The method of claim 20 wherein the regional navigation satellite system signal(s) are selected from the group consisting of: Omnistar signal(s), StarFire signal(s), Centerpoint signal(s), Beidou signal(s), Doppler orbitography and radio-positioning integrated by satellite (DORIS) signal(s), Indian regional navigational satellite system (IRNSS) signal(s), and quasi-zenith satellite system (QZSS) signal(s).

23. The method of claim 20 wherein the SBAS signal(s) are selected from the group consisting of: wide area augmentation system (WAAS) signal(s), European geostationary navigation overlay service (EGNOS) signal(s), multifunctional satellite augmentation system (MSAS) signal(s), and GPS aided geo augmented navigation (GAGAN) signal(s).

24. The method of claim 20 wherein the GBAS signal(s) are selected from the group consisting of: local area augmentation system (LAAS) signal(s), ground-based regional augmentation system (GRAS) signals, Differential GPS (DGPS) signal(s), and continuously operating reference stations (CORS) signal(s).

* * * * *